United States Patent
Feng et al.

(10) Patent No.: US 10,755,081 B2
(45) Date of Patent: Aug. 25, 2020

(54) METHOD AND APPARATUS FOR IDENTIFYING PUPIL IN IMAGE

(71) Applicant: CHINA UNIONPAY CO., LTD., Shanghai (CN)

(72) Inventors: Liang Feng, Shanghai (CN); Zihao Cai, Shanghai (CN); Yawei Yin, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 18 days.

(21) Appl. No.: 15/773,319

(22) PCT Filed: Nov. 4, 2016

(86) PCT No.: PCT/CN2016/104734
§ 371 (c)(1),
(2) Date: May 3, 2018

(87) PCT Pub. No.: WO2017/080410
PCT Pub. Date: May 18, 2017

(65) Prior Publication Data
US 2018/0322332 A1    Nov. 8, 2018

(30) Foreign Application Priority Data
Nov. 11, 2015   (CN) .......................... 2015 1 0765986

(51) Int. Cl.
| | | |
|---|---|---|
| *G06T 7/73* | (2017.01) | |
| *G06T 7/13* | (2017.01) | |
| *G06F 3/01* | (2006.01) | |
| *G06K 9/00* | (2006.01) | |
| *G06T 5/00* | (2006.01) | |
| *G06T 11/20* | (2006.01) | |

(52) U.S. Cl.
CPC ......... *G06K 9/00234* (2013.01); *G06F 3/013* (2013.01); *G06T 5/002* (2013.01); *G06T 7/13* (2017.01); *G06T 7/73* (2017.01); *G06T 11/206* (2013.01); *G06K 9/0061* (2013.01)

(58) Field of Classification Search
None
See application file for complete search history.

(56) References Cited

U.S. PATENT DOCUMENTS

| | | | |
|---|---|---|---|
| 2016/0202756 A1* | 7/2016 | Wu | ........................ G06F 3/013 382/103 |
| 2016/0202757 A1* | 7/2016 | Miao | ....................... H04N 5/33 348/78 |

* cited by examiner

*Primary Examiner* — Idowu O Osifade
(74) *Attorney, Agent, or Firm* — The Ollila Law Group LLC

(57) ABSTRACT

A method and device for identifying a pupil in an image is provided. The method comprises four steps including: A. image preprocessing, B. edge detecting, C. building connected graphs, and D. screening connected graph pairs.

10 Claims, 2 Drawing Sheets

METHOD AND APPARATUS FOR IDENTIFYING PUPIL IN IMAGE

TECHNICAL FIELD

Embodiments of the present invention relates to image identification, and in particular to a method and a device for identifying a pupil in an image.

BACKGROUND ART

Currently, apparatus, such as ATM, mobile phone, notebook, PC and the like, are all equipped with cameras. Cameras may be utilized for eyeball tracking, which includes information acquiring, modeling and simulating eyeball movement. Pupil identification is a prerequisite step for eyeball tracking.

BRIEF SUMMARY OF THE INVENTION

A method of identifying a pupil in an image comprises: A. image preprocessing; B. edge detecting; C. building connected graphs comprising marking off connected regions based on edge lines of edge graphs, dividing connected regions into two categories having a grey-scale value between 100 and 200 and a grey-scale value over 200, respectively, and for connected graphs of these two categories, selecting connected graph pairs, in which edge lines of a connected graph b having a grey-scale value over 200 are included in edge lines of a connected graph a having a grey-scale value between 100 and 200; D. screening connected graph pairs, comprising, for each of connected graph pairs, calculating a centroid pixel location b_Location of the connected graph b, a pixel length b_Major of a major axis and a pixel length b_Minor of a minor axis of an ellipse that has the same standardized second-order central moment as its connected region, connecting the connected graphs a and b to obtain a new image c and calculating a centroid pixel location c_Location of the image c, a pixel length c_Major of a major axis and a pixel length c_Minor of a minor axis of an ellipse that has the same standardized second-order central moment as its connected region, for each of connected graph pairs, calculating a pixel distance L between the centroid pixel location b_Location and c_Location, the ratio R of b_Major to c_Major and the ratio P of b_Minor to c_Minor, and for each of connected graph pairs, calculating W=L−m*R−n*P, wherein m and n are weight factors, and selecting the connected graph b in the connected graph pair that has the maximum value of W as the identified pupil.

The image preprocessing comprises building a grey-scale image of an original image, and de-noising the grey-scale image.

The original image is obtained by acquiring an input video, segmenting the video into a plurality of pictures according to time intervals, and taking the first picture as the original image for identifying the pupil.

The grey-scale image of the original image is built by acquiring R, G and B values of each of pixels of the original image, and for each of pixels, selecting the maximum value among its R, G and B values as the grey-scale value of the pixel.

The edge detecting comprises calculating a gradient image of the grey-scale image, for the gradient image, taking pixels that have a value larger than a specified threshold value as the edge pixel to build an edge graph.

A device for identifying a pupil in an image comprises: A. an image preprocessing unit; B. an edge detecting unit; C. a connected graph building unit configured to perform steps of: marking off connected regions based on edge lines of edge graphs, dividing connected regions into two categories having a grey-scale value between 100 and 200 and a grey-scale value over 200, respectively, and for connected graphs of these two categories, selecting connected graph pairs, in which edge lines of a connected graph b having a grey-scale value over 200 are included in edge lines of a connected graph a having a grey-scale value between 100 and 200; D. a connected graph pair screening unit configured to perform steps of: for each of connected graph pairs, calculating a centroid pixel location b_Location of the connected graph b, a pixel length b_Major of a major axis and a pixel length b_Minor of a minor axis of an ellipse that has the same standardized second-order central moment as its connected region, connecting the connected graphs a and b to obtain a new image c and calculating a centroid pixel location c_Location of the image c, a pixel length c_Major of a major axis and a pixel length c_Minor of a minor axis of an ellipse that has the same standardized second-order central moment as its connected region, for each of connected graph pairs, calculating a pixel distance L between the centroid pixel location b_Location and c_Location, the ratio R of b_Major to c_Major, and the ratio P of b_Minor to c_Minor, and for each of connected graph pairs, calculating W=L−m*R−n*P, wherein m and n are weight factors, and selecting the connected graph b in the connected graph pair that has the maximum value of W as the identified pupil.

The image preprocessing unit is configured to perform steps of building a grey-scale image of an original image, and de-noising the grey-scale image.

The original image is obtained by acquiring an input video, segmenting the video into a plurality of pictures according to time intervals, and taking the first picture as the original image for identifying the pupil.

The grey-scale image of the original image is built by acquiring R, G and B values of each of pixels of the original image, and for each of pixels, selecting the maximum value among its R, G and B values as the grey-scale value of the pixel.

The edge detecting unit is configured to perform steps of calculating a gradient image of the grey-scale image, for the gradient image, taking pixels that have a value larger than a specified threshold value as the edge pixels to build an edge graph.

According to embodiments of the present invention, after an image of a human face is received, the location of a pupil may be fleetly identified by utilizing a relative location of the pupil to the eye and the ratio of pixels of axes of the image fitted ellipse. Embodiments of the present invention may be done without any other external apparatus and manual judgment. The present invention proposes using parameters to adjust and set each weight of information, such that the method and device for identifying a pupil in an image have high flexibility and adaptability.

Additional features and advantages of embodiments of the present invention will also be understood from the following description when read in conjunction with the accompanying drawings in which the principles of embodiments of the present invention are illustrated by way of examples.

DETAILED DESCRIPTION OF EMBODIMENTS

The principles of the present invention will be described in conjunction with the embodiments thereinafter. It should be understood that these embodiments are given merely for one skilled in the art to better understand and further practice the present invention, but not for limiting the scope of the present invention. For example, while this specification contains many specific implementation details, these should not be construed as limitations on the scope of the present invention or of what may be claimed, but rather as descriptions specific to embodiments. For example, features described in the context of various embodiments may be practiced in combination in a single embodiment. Features described in the context of a single embodiment may be practiced in multiple embodiments.

Figure 1:
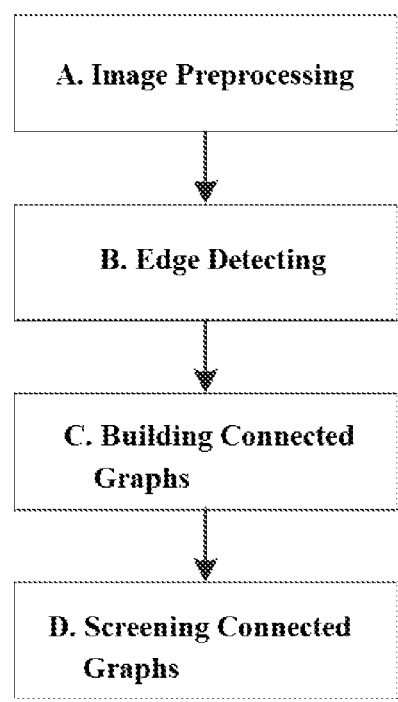
FIG. 1 is a flow chart of the method of identifying a pupil in an image according to embodiments of the present invention.

FIG. 1 is a flow chart of the method of identifying a pupil in an image according to embodiments of the present invention. As shown in the figure, the method comprises four steps including: A. image preprocessing, B. edge detecting, C. building connected graphs, and D. screening connected graph pairs.

A. The image preprocessing may comprise building a grey-scale image of an original image, and de-noising the grey-scale image, wherein the original image may be obtained by acquiring an input video, segmenting the video into a plurality of pictures according to time intervals, and taking the first picture as the original image for identifying the pupil. The grey-scale image of the original image is built by acquiring R, G and B values of each of pixels of the original image, and for each of pixels, selecting the maximum value among its R, G and B values as the grey-scale value of the pixel.

B. The edge detecting comprises calculating a gradient image of the grey-scale image, for the gradient image, taking pixels that have a value larger than a specified threshold value as edge pixels to build an edge graph. In this case, the gradient image of the grey-scale image may be calculated using Prewitt detection operator.

C. Building connected graphs may comprise:
marking off connected regions based on edge lines of edge graphs,
dividing connected regions into two categories having a grey-scale value between 100 and 200 and a grey-scale value over 200, respectively,
for connected graphs of these two categories, selecting connected graph pairs, in which edge lines of a connected graph b having a grey-scale value over 200 are included in edge lines of a connected graph a having a grey-scale value between 100 and 200. The selected connected graph pairs constitute a candidate list, which may be represented as Arr={<a1, b1>, <a2, b2>, . . . , <an, bn>} in the form of an array, where n is the length of the array.

D. screening connected graph pairs may comprise:
for each of connected graph pairs, calculating a centroid pixel location b_Location of the connected graph b, a pixel length b_Major of a major axis and a pixel length b_Minor of a minor axis of an ellipse that has the same standardized second-order central moment as its connected region,
connecting the connected graphs a and b to obtain a new image c, calculating a centroid pixel location c_Location of the image c, a pixel length c_Major of a major axis and a pixel length c_Minor of a minor axis of an ellipse that has the same standardized second-order central moment as its connected region, for each of connected graph pairs, calculating a pixel distance L between the centroid pixel location b_Location and c_Location, the ratio R of b_Major to c_Major, and the ratio P of b_Minor to c_Minor, for each of connected graph pairs, calculating W=L−m*R−n*P, wherein m and n are weight factors, which are typically set to a positive number, but may be set respectively depending on practical conditions, selecting the connected graph b in the connected graph pair that has the maximum value of W as the identified pupil.

Each block of FIG. 1 may be regarded as a method step and/or as an operation caused by executing computer program codes and/or as a plurality of logic circuit elements coupled together that are built for implementing related functions.

The exemplary embodiments of this invention may be implemented in hardware or in software or in a combination thereof. For example, certain aspects of the present invention may be implemented in hardware, and others may be implemented in software. While aspects of the exemplary embodiments of the present invention may be shown and described as block diagrams and flow charts, it will be readily understood that these devices or methods described herein may be implemented as functional modules in a system described by way of a non-limiting example.

Figure 2:
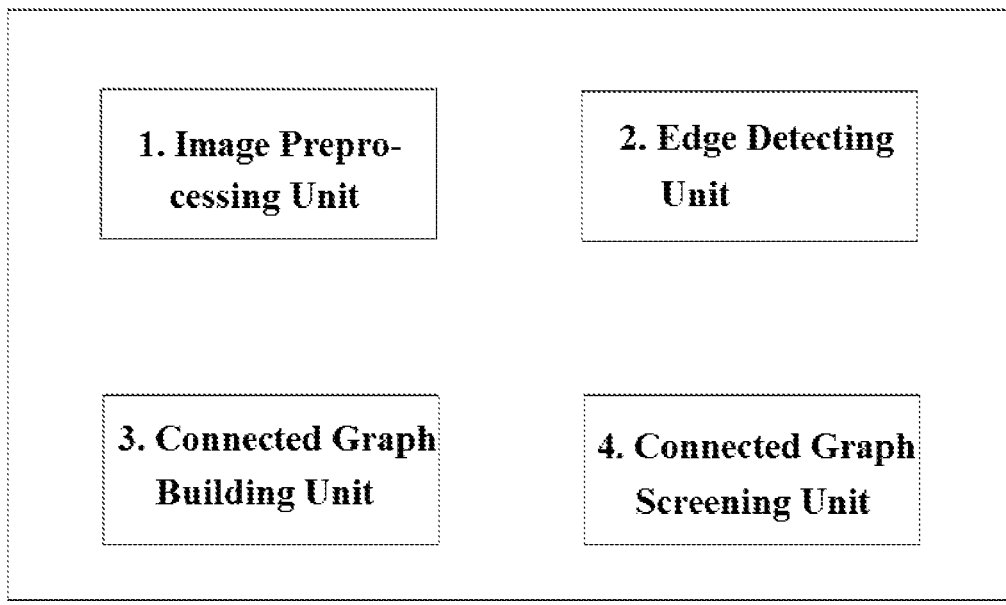
FIG. 2 is a schematic diagram of the device for identifying a pupil in an image according to embodiments of the present invention.

FIG. 2 is a schematic diagram of the device for identifying a pupil in an image according to embodiments of the present invention. As shown in the figure, the device comprises four units including: A. an image preprocessing unit, B. an edge detecting unit, C. a connected graph building unit, and D. a connected graph pair screening unit.

A. The image preprocessing unit is configured to perform steps of building a grey-scale image of an original image, and de-noising the grey-scale image.

B. The edge detecting unit is configured to perform steps of calculating a gradient image of the grey-scale image, for the gradient image, taking pixels that have a value larger than a specified threshold value as the edge pixels to build an edge graph.

C. The connected graph building unit is configured to perform steps of:
marking off connected regions based on edge lines of edge graphs,
dividing connected regions into two categories having a grey-scale value between 100 and 200 and a grey-scale value over 200, respectively,
for connected graphs of these two categories, selecting connected graph pairs, in which edge lines of a connected graph b having a grey-scale value over 200 are included in edge lines of a connected graph a having a grey-scale value between 100 and 200.

D. The connected graph pair screening unit is configured to perform steps of:
for each of connected graph pairs, calculating a centroid pixel location b_Location of the connected graph b, a pixel length b_Major of a major axis and a pixel length b_Minor of a minor axis of an ellipse that has the same standardized second-order central moment as its connected region,
connecting the connected graphs a and b to obtain a new image c, calculating a centroid pixel location c_Location of the image c, a pixel length c_Major of a major axis and a pixel length c_Minor of a minor axis of an ellipse that has the same standardized second-order central moment as its connected region, for each of connected graph pairs, calculating a pixel distance L between the centroid pixel location b_Location and c_Location, the ratio R of b_Major to c_Major and the ratio P of b_Minor to c_Minor, for each of connected graph pairs, calculating W=L−m*R−n*P, wherein m and n are weight factors, selecting the connected graph b in the connected graph pair that has the maximum value of W as the identified pupil.

Furthermore, each unit of the above-described device should not be understood as requiring such separation in all embodiments, and it should be understood that the described program components and systems can generally be integrated in a single software product, or be packaged into multiple software products.

Various modifications and variations to the foregoing exemplary embodiments of the present invention will become apparent to those skilled in the relevant art upon reading the foregoing specification in conjunction with the accompanying drawings. Therefore, embodiments of the present invention are not limited to the disclosed particular embodiments, and the variations and other embodiments are intended to be encompassed within the scope of the appended claims.

The invention claimed is:

1. A method of identifying a pupil in an image, comprising:
   A. image preprocessing for preprocessing the image;
   B. edge detecting;
   C. building connected graphs, comprising:
   marking off connected regions based on edge lines of edge graphs,
   dividing connected regions into two categories having a grey-scale value between 100 and 200 and a grey-scale value over 200, respectively,
   for connected graphs of these two categories, selecting connected graph pairs, in which edge lines of a connected graph b having a grey-scale value over 200 are included in edge lines of a connected graph a having a grey-scale value between 100 and 200;
   D. screening connected graph pairs, comprising:
   for each of connected graph pairs, calculating a centroid pixel location b_Location of the connected graph b, a pixel length b_Major of a major axis and a pixel length b_Minor of a minor axis of an ellipse that has the same standardized second-order central moment as its connected region,
   connecting the connected graphs a and b to obtain a new image c, calculating a centroid pixel location c_Location of the image c, a pixel length c_Major of a major axis and a pixel length c_Minor of a minor axis of an ellipse that has the same standardized second-order central moment as its connected region,
   for each of connected graph pairs, calculating a pixel distance L between the centroid pixel location b_Location and c_Location, a ratio R of b_Major to c_Major, and a ratio P of b_Minor to c_Minor,
   for each of connected graph pairs, calculating W=L−m*R−n*P, wherein m and n are weight factors,
   selecting the connected graph b in the connected graph pair that has the maximum value of W as the identified pupil.

2. The method of claim 1, wherein,
the image preprocessing comprises:
building a grey-scale image of an original image,
de-noising the grey-scale image.

3. The method of claim 2, wherein,
the original image is obtained by:
acquiring an input video, segmenting the video into a plurality of pictures according to time intervals, and taking the first picture as the original image for identifying the pupil.

4. The method of claim 3, wherein,
the grey-scale image of the original image is built by:
acquiring R, G and B values of each of pixels of the original image, and for each of pixels, selecting the maximum value among its R, G and B values as the grey-scale value of the pixel.

5. The method of claim 1, wherein,
the edge detecting comprises:
calculating a gradient image of the grey-scale image,
for the gradient image, taking pixels that have a value larger than a specified threshold value as edge pixels to build an edge graph.

6. A device for identifying a pupil in an image, comprising:
   A. an image preprocessing circuit for preprocessing the image;
   B. an edge detecting circuit;
   C. a connected graph building circuit configured to perform steps of:
   marking off connected regions based on edge lines of edge graphs,
   dividing connected regions into two categories having a grey-scale value between 100 and 200 and a grey-scale value over 200, respectively,
   for connected graphs of these two categories, selecting connected graph pairs, in which edge lines of a connected graph b having a grey-scale value over 200 are included in edge lines of a connected graph a having a grey-scale value between 100 and 200;
   D. a connected graph pair screening circuit configured to perform steps of:
   for each of connected graph pairs, calculating a centroid pixel location b_Location of the connected graph b, a pixel length b_Major of a major axis and a pixel length b_Minor of a minor axis of an ellipse that has the same standardized second-order central moment as its connected region,
   connecting the connected graphs a and b to obtain a new image c, calculating a centroid pixel location c_Location of the image c, a pixel length c_Major of a major axis and a pixel length c_Minor of a minor axis of an ellipse that has the same standardized second-order central moment as its connected region,
   for each of connected graph pairs, calculating a pixel distance L between the centroid pixel location b_Location and c_Location, the ratio R of b_Major to c_Major, and the ratio P of b_Minor to c_Minor,
   for each of connected graph pairs, calculating W=L−m*R−n*P, wherein m and n are weight factors,
   selecting the connected graph b in the connected graph pair that has the maximum value of W as the identified pupil.

7. The device of claim 6, wherein,
the image preprocessing circuit is configured to perform steps of:
building a grey-scale image of an original image,
de-noising the grey-scale image.

8. The device of claim 7, wherein,
the original image is obtained by:
acquiring an input video, segmenting the video into a plurality of pictures according to time intervals, and taking the first picture as the original image for identifying the pupil.

9. The device of claim 8, wherein, the grey-scale image of the original image is built by:

acquiring R, G and B values of each of pixels of the original image, and for each of pixels, selecting the maximum value among its R, G and B values as the grey-scale value of the pixel.

10. The device of claim 6, wherein, the edge detecting circuit is configured to perform steps of:

calculating a gradient image of the grey-scale image, for the gradient image, taking pixels that have a value larger than a specified threshold value as the edge pixels to build an edge graph.

\* \* \* \* \*